United States Patent
Moore et al.

(10) Patent No.: US 7,171,663 B2
(45) Date of Patent: Jan. 30, 2007

(54) EXTERNAL EVENT INTERRUPT FOR SERVER-SIDE PROGRAMS

(75) Inventors: Victor S. Moore, Boynton Beach, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 10/314,698

(22) Filed: Dec. 9, 2002

(65) Prior Publication Data

US 2004/0111729 A1  Jun. 10, 2004

(51) Int. Cl.
*G06F 9/455* (2006.01)
*G06F 9/46* (2006.01)

(52) U.S. Cl. .......................................... 718/1; 719/318
(58) Field of Classification Search .................... 718/1, 718/100, 102; 709/201–203; 719/313–316, 719/318
See application file for complete search history.

(56) References Cited

U.S. PATENT DOCUMENTS

| | | | |
|---|---|---|---|
| 5,999,986 A | 12/1999 | McCauley III, et al. | 709/300 |
| 6,131,118 A | 10/2000 | Stupek Jr., et al. | 709/223 |
| 6,225,995 B1 | 5/2001 | Jacobs et al. | 345/335 |
| 2002/0059472 A1 * | 5/2002 | Wollrath et al. | 709/318 |
| 2002/0073063 A1 * | 6/2002 | Faraj | 707/1 |
| 2003/0088604 A1 * | 5/2003 | Kuck et al. | 709/1 |
| 2004/0003273 A1 * | 1/2004 | Grawrock et al. | 713/193 |
| 2004/0060048 A1 * | 3/2004 | Abelite et al. | 718/1 |

OTHER PUBLICATIONS

Bodoff, Stephanie, *J2ee Tutorial: Chapter 12: Java Servlet Technology*, pp. 495-509, <http://java.sun.com/j2ee/tutorial/1_3-fcs/doc/Servlets.html>, (Apr. 24, 2002).
Papageorge, John, *Getting Started With JDBC*, <http://developer.java.sun.com/developer/technicalArticles/Interviews/StartJDBC/>, (Aug. 1997).
Java™ *Sevlet Technology White Paper*, <http://java.sun.com/products/servlet/whitepaper.html>.

* cited by examiner

*Primary Examiner*—Meng-Al T. An
*Assistant Examiner*—Camquy Truong
(74) *Attorney, Agent, or Firm*—Akerman Senterfitt

(57) ABSTRACT

A method for handling external events within a server-side program running within a virtual machine can include beginning a first process within the server-side program and responsively launching a first event monitor. The method can broadcast a virtual machine event responsive to an external event occurring outside the virtual machine. The first event monitor can detecting the virtual machine and invoke a first program response.

34 Claims, 2 Drawing Sheets

EXTERNAL EVENT INTERRUPT FOR SERVER-SIDE PROGRAMS

BACKGROUND OF THE INVENTION

1. Technical Field

The present invention relates to the field of software, and more particularly, to event handling within servers.

2. Description of the Related Art

Web service providers recognize the need for dynamic content or Web pages that are responsive to user interactions. Such user interactions can involve both client and server-side processing. Client side processing can be useful for allowing small programs, such as applets, to be executed within a user's browser on the user's machine. Server-side programs, however, are often needed for more involved tasks, such as database lookups. In order to perform these server-side tasks, a Web server can act as an interface between a client program, often a browser, and a server program, such as a database.

One of the methods for performing server-side processing involves the use of virtual machines. A virtual machine can be an interface between compiled programming code and a particular hardware platform. Consequently, a virtual machine can allow application programs to be built that can run on any hardware platform without having to be rewritten or recompiled by the programmer for each separate platform. One such virtual machine is a Java virtual machine that can include servlets as compatible server-side programs.

A servlet is a protocol and platform independent server-side component that can utilize a request-response programming model. Each user request handled by a servlet can result in the utilization of a single thread within the processor of the server. Accordingly, servlet processing overhead is slight compared to implementations using a common gateway interface (CGI) which initializes a new process for every user request for which the CGI responds. Notably, a servlet can process client requests in a synchronous manner so that when a client issues a request, the client must wait until the servlet has completed the request. Unfortunately, the client has no way to interrupt or otherwise modify a process executing within the servlet before completion.

For example, a client can submit a request resulting in a server processing a large Voice XML (Voice Extensible Markup Language) document. The server can receive the client request and can utilize a servlet to produce a response. After the servlet has been initiated, however, a "hang up" event occurs making the response moot. Without external event handling capabilities, the servlet will complete the initiated VoiceXML processing even though the "hang up" event renders the response meaningless to the original requesting client. That is, the client may have to wait for a time-out event to occur within the servlet and cannot trigger such an event externally. Accordingly, processing time and server resources can be needlessly wasted.

SUMMARY OF INVENTION

The invention disclosed herein provides a system and a method for server-side programs within a virtual machine to handle external events. Presently, many virtual machines perform synchronous request processing using a request-response paradigm with no external event handling. This invention can add an event processor, an event dispatcher, and event monitors to a virtual machine, extending the capabilities of the virtual machine to include external event handling. More particularly, the event processor can be configured to detect external events and responsively trigger the event dispatcher. Once triggered, this event dispatcher can broadcast virtual machine events detectable by the event monitors from within server-side programs. A specified action can then be triggered responsive to each detection within each event monitor.

One aspect of the present invention can include a method for handling external events within a server-side program running within a virtual machine. The method can include beginning a first process within the server-side program. In one embodiment, the first process can be performed by a first thread. The method can also launch a first event monitor responsive to said first process. In an embodiment including the first thread, the event monitor can be linked to the first thread. Next, a virtual machine event can be broadcasted responsive to an external event that occurred outside the virtual machine. This virtual machine event can be detected by the first event monitor resulting in a first program response.

For example, in a particular embodiment, an HTTP (Hypertext Transfer Protocol) client can submit an external event to a Web server. A virtual machine within this Web server, can be executing a server-side program, such as a Java servlet. Responsive to this external event, an internal event, such as a thread termination event, can be broadcast. This thread termination event can be detected by the first event monitor causing the first thread to terminate. Once the thread has terminated, the first event monitor can be terminated. In another embodiment, the first thread can terminate upon completing its assigned task. Thereafter, the first event monitor can be terminated as well.

In one embodiment, a second process can begin within the server-side program while the first process is still executing. In a manner similar to that of the first process, this second process can cause the launching of a second event monitor capable of detecting one or more virtual machine events and invoking a second program response. This second process can be performed by a second thread. Notably, the first event monitor and the second event monitor can both detect a single virtual machine event. Even so, the first program response can be different from the second program response. Also, particular virtual machine events may be detected by the first event monitor and not detected by the second event monitor.

Another aspect of the present invention can include a method for configuring an external event handler within a virtual machine. The method can invoke a server-side program, instantiate an event dispatcher configured to broadcast at least one virtual machine event, and start at least one process within the server-side program. Additionally, for each process started, an event monitor can be initiated. The event monitor can be configured to detect at least one virtual machine event. In one embodiment, the method can receive an external event and trigger the event dispatcher to broadcast at least one virtual machine event responsive to said external event. For example, in a particular embodiment, the external event can be a program interrupt causing the broadcast of a virtual machine event resulting in the termination of each process running within the server-side program as well as the termination of the server-side program. Notably, not all virtual machine events that the event monitors can detect need be virtual machine events broadcasted by the event dispatcher.

Yet another aspect of the present invention can include a system for handling external events within a server-side program. The system can include a virtual machine disposed within a server, and an event processor disposed within said virtual machine configured to accept at least one external event. In one embodiment, this server can be a Web server capable of responding to HTTP (Hypertext Transfer Protocol) clients. The system can further include a server-side program disposed within the virtual machine and configured to process at least one client request. Notably, multiple instances of the server-side program can simultaneously operate within the virtual machine. In a particular embodiment, the server-side program can be a servlet.

The system can also include an event dispatcher disposed within the server-side program configured to broadcast at least one virtual machine event responsive to a broadcast trigger activated by the event processor. Moreover, the system can include at least one virtual machine event monitor, wherein each virtual machine event monitor can be linked to a specified process resulting from a client request. Each virtual machine event monitor can detect at least one virtual machine event and responsively act upon the process to which it is linked. In one embodiment, the server-side program can be constructed using an object-oriented methodology. In such an embodiment, a container object can exist for containing a server-side program object as well as an event dispatcher object. This event dispatcher object can contain multiple methods including an add virtual machine event monitor method, a remove virtual machine event monitor method, and a broadcast virtual machine event method.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION

The invention disclosed herein provides a system and a method for a server-side program within a virtual machine (VM) to handle external events. Many conventional server-side programs, such as servlets, can only process client requests synchronously, thusly requiring the requesting client to wait for a response before taking further action. This invention provides a method wherein an otherwise synchronous server-side program can respond to external events. More particularly, an external event can be received by the VM. Responsive to the external event, an internal event (VM event) can be broadcast within the VM. This VM event can be detected by executing server-side programs resulting in specified actions within the executing server-side programs.

Figure 1:
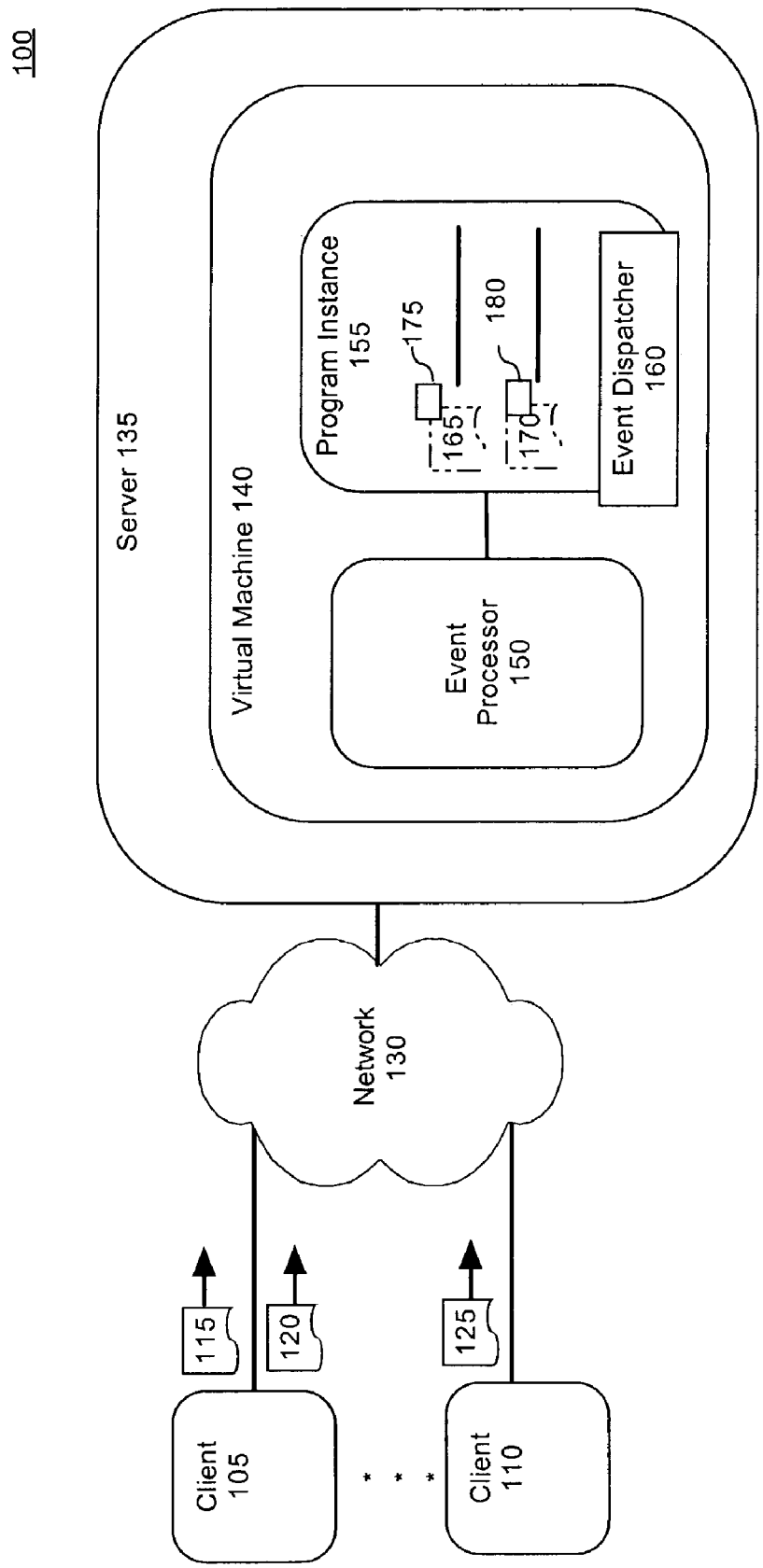
FIG. 1 is a schematic diagram illustrating an exemplary server-side program in accordance with the inventive arrangements disclosed herein.

FIG. 1 is a schematic diagram illustrating a system 100 for an exemplary server-side program in accordance with the inventive arrangements disclosed herein. The system 100 can include a server 135, a virtual machine 140, an event processor 150, a program instance 155, and an event dispatcher 160. The server 135 can be a computing device configured to receive and fulfill requests from client programs. For example, in one embodiment, the server 135 can be a Web server that serves Web pages to requesting clients, such as clients 105 and 110, across a network 130.

The virtual machine 140 can be an interface between compiled programming code and a particular hardware platform configured to function as a logically defined processor. Consequently, the virtual machine 140 can allow application programs to be built that can run on any hardware platform without having to be rewritten or recompiled by a programmer for each separate platform. In one embodiment, the virtual machine 140 can be a Java virtual machine specifying an instruction set, a set of registers, a stack, a garbage heap, and a method area.

The program instance 155 can be an instantiation of a server-side program configured to operate within the virtual machine 140. Once loaded and instantiated, the program instance 155 can process multiple requests. In one embodiment, each request processed by the program instance 155 can be a separate thread capable of performing a specified task. In a particular embodiment where the server-side program is a Java servlet, the program instance 155 can be a servlet instance. The program instance 155 can include threads 165 and 170, event monitors 175 and 180, and an event dispatcher 160. Notably, in particular embodiments, multiple program instances for a single program can simultaneously function within the virtual machine 140. Additionally, in other embodiments, different individual programs and one or more instances thereof can concurrently function within the virtual machine 140.

The threads 165 and 170 can be execution streams capable of parallel operations. By utilizing threads 165 and 170 within the program instance 155 instead of separate process instances, numerous advantages can be achieved. For example, in comparing threads to separate processes, threads can require substantially lower overhead, can execute faster, and can take advantage of multiple central processing units (CPUs). In one embodiment, a thread pool can be created where each task can utilize an available thread. Threads can then be returned to a "free" pool upon task completion. Such an embodiment can reduce overhead associated with thread creation and termination. In another embodiment, threads can be created and terminated on demand.

The event monitors 175 and 180 can detect and react to defined events that occur within the virtual machine 140. These VM events should be differentiated from external events that the event monitors 175 and 180 cannot detect. In a particular embodiment, the event monitors 175 and 180 can trigger developer specified actions whenever a monitored event is detected. Additionally, the event monitors 175 and 180 can be logical components built into the virtual machine 140 itself. Thusly, developers can utilize these pre-built event monitors without extensive development expenditures. For example, in one embodiment, the event monitors 175 and 180 can be Java listeners configured to detect events within a Java virtual machine, such as time out events, creation events, initialization events, and destruction events, as well as attribute additions, deletions, and modifications. In another embodiment, the event monitors 175 and 180 can be linked to particular threads, such as thread 165 and thread 170, respectively.

The event dispatcher 160 can contain methods for adding and removing event monitors, including event monitors 175 and 180, as well as methods for broadcasting VM events to one or more event monitors. For example, in one embodiment, the event dispatcher 160 can broadcast a VM event for which the event monitor 175 is configured to detect. Upon detecting the monitored VM event, event monitor 175 can terminate the execution of the thread 165 to which event monitor 175 is linked. In another embodiment, the event dispatcher 160 can broadcast a VM event for which both event monitor 175 and event monitor 170 are configured to detect. Notably, the event processor 150 can receive an external event and responsively trigger the event dispatcher 160 to broadcast one or more VM events.

In one embodiment, the event processor 150 can maintain a cross-reference listing of external to internal data events to facilitate its operations. It should be emphasized that a single external event can result in the broadcasting of multiple VM events or, alternately, no VM event. For example, in a particular embodiment, the client 115 with multiple processes running within the program instance 155 can send an external request to terminate all processes. Consequently, the event processor 150 can trigger a VM event to be broadcast for each process running within the program instance 155 initiated by the client. Similarly, in another embodiment, the event dispatcher 160 can maintain a cross-reference listing of executing VM events and associated event monitors to maintain the proper relationships between VM events and event monitors.

Notably, in one embodiment, each event monitor, including the event monitors 175 and 180, can detect multiple events and can contain executable code triggered whenever any specified event occurs. Additionally, some events detectable by an event monitor can be events not broadcasted by the event dispatcher 160. For example, in a particular embodiment, the event monitor 175 can contain a process status method triggered whenever a process VM event is broadcasted.

In another embodiment utilizing a thread pool, an event monitor can be deactivated whenever a thread is within a free thread area. Accordingly, whenever thread 165 finishes processing and returns to the thread pool, the event monitor 175 can detect the task completion and trigger an event monitor method deactivating itself. It should be noted that the thread completion event detected by the event monitor 175 is not a broadcasted VM event.

In operation, a client 105 can transmit an external request 115 across the network 130 to the server 135. Next, the server 135 can relay the request 115 to the virtual machine 140. In response to the request, a server-side program can be loaded by the virtual machine 140 and instantiated as the program instance 155. When the program instance 155 is initialized, a corresponding event dispatcher 160 can be instantiated as well. Thereafter, thread 165 can be generated to respond to the request 115. Furthermore, the event monitor 175 can be instantiated and linked to the newly created thread 165. Next, the client 110 can transmit the external request 125 across the network 130 to server 135. As a result of steps similar to those just mentioned, a new thread, thread 170 with associated event monitor 180 can be created within the program instance 155.

At this point, the client 105 can transmit the external event 120 through the network 130 to the server 135. Then, the event processor 150 can detect the external event 120 and responsively trigger the event dispatcher 160 to broadcast a VM event. The event dispatcher 160 can then broadcast the specified VM event, which the event monitors 175 and 180 can detect. Finally, the event monitors 175 and 180 can perform previously specified actions in response to the detected event.

It should be noted that the afore mentioned example exhibits one possible embodiment that utilizes external event interrupts. The invention contemplates many other applications. For example, in another embodiment, the invention can be utilized in conjunction with a remote server resource, such as a voice recognition server, that is configured to perform complex tasks. Since each of these task, including voice recognition tasks, can take substantial time to perform, it can be beneficial to free up the server 135 while each voice recognition task is processed by the remote server resource. Accordingly, each voice recognition task can be returned asynchronously to the server 135. Consequently, the completion of a voice recognition task can trigger a voice recognition completion event that can be handled by the server 135.

Figure 2:
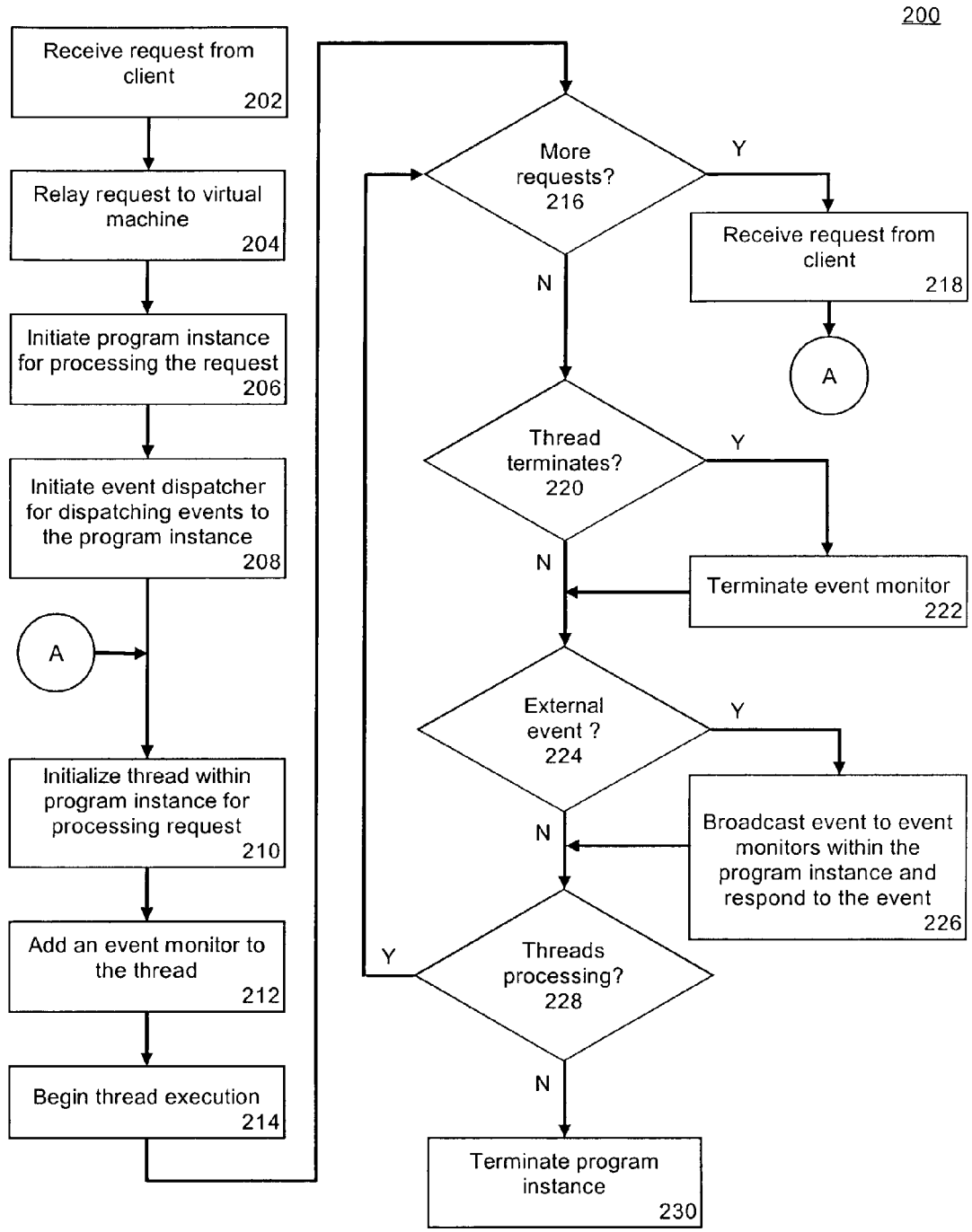
FIG. 2 is a flow chart illustrating a method for handling external events within a server-side program instance in accordance with the inventive arrangements disclosed herein.

FIG. 2 is a flow chart illustrating a method 200 for handling external interrupts within a server-side program instance in accordance with the inventive arrangements disclosed herein. The method 200 can be performed in the context of a client/server architecture where threads are created and terminated for each task received and completed. The method can begin in step 202 where the server can receive a request from a client. For example, in one embodiment, a client can submit a request via a Web browser to a Web server. In step 204, the server can receive the request and relay it to a virtual machine disposed within the server.

In step 206, a program instance can be instantiated for processing the request. If the program instance is not presently loaded in memory, loading can occur before instantiation. Notably, in step 208, an event dispatcher can also be instantiated at this time. In step 210, a thread can be initialized within the program instance for processing the request. Notably, a thread can be an execution stream capable of functioning in parallel with other threads.

In step 212, an event monitor can be added for the thread. The event monitor can detect and react to defined events that occur within the virtual machine. Events the event monitor can detect include, but are not limited to, initializations, destructions, attribute modifications, attribute additions, invalidations, and timeouts. For example, an event monitor can monitor a thread for a thread termination event. Notably, in an embodiment where the program instance is a servlet instance, the event monitor can be a listener object. In step 214, after the event monitor has been added to the thread, the thread can begin executing its assigned task.

In step 216, the method 200 can search for additional requests that require processing. If more requests exist, the method can proceed to step 218 where the server can receive another request from the client. Thereafter, the method can proceed to steps 210, 212, and 214, where a new thread and event monitor can be initiated within the program instance for the new request and the new thread can begin execution. Notably, a given program instance can simultaneously execute multiple threads, each of which can correspond to a request.

If there are no additional requests, the method can proceed to step 220, where the method can detect thread terminations. If a thread has terminated, step 222 can be performed and the event monitor can be removed. Appreciably, a thread can be terminated upon task completion. Once the event monitor is removed, the method can proceed to step 224.

If no threads have terminated, the method can proceed to step 224. In step 224, the method can check for an external event. Notably, an external event can relate to currently processing requests. For example, an external event can be a request to terminate a database search that a user previously requested. If an external event is detected, the method can proceed to step 226, otherwise the method can continue to step 228.

In step 226, the external event can be interpreted by an event processor. This event processor can cause an event dispatcher to broadcast an event corresponding to the external event. For example, in one embodiment, an external event can be a client request to proceed to a home Web page. Assuming the same client was currently in a wait cycle until a previous request was satisfied, the event processor can determine that it is appropriate to terminate the previous client request. Hence, the event processor can cause the event dispatcher to broadcast a thread termination event to the program instance. In another embodiment, the event processor can maintain a listing that references external events to internal events. This listing can be used within the virtual machine to track and maintain proper relationships.

Notably, individual event monitors associated with threads and disposed within the program instance can detect broadcasted events. Moreover, the event dispatcher can maintain a listing of associations between event monitors and corresponding threads. Additionally, event monitors can be configured to take a specified action upon the detection of a monitored event. Furthermore, in particular embodiments, such as certain embodiments where an event monitor is implemented as an object-oriented class, these specified actions can be programmed and stored within each event monitor. In one embodiment, the -specified action can be to terminate a currently operating thread. One of ordinary skill in the art can appreciate that because each thread would otherwise needlessly complete execution before being terminated, both server resources and client response time can be enhanced by the method 200. Upon completing step 226, the method can proceed to step 228.

In step 228, the method can determine if there are any threads still processing within the program instance. If threads are still processing, the method can jump to step 216 and repeat previously detailed steps. If no threads are still processing, however, the method can proceed to step 230 where the program instance can be terminated. It should be noted that although method 200 depicts the invention as a sequence of steps, the invention can, and often will, be an event-driven solution the responds to internal and external events as they arise.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for handling external events within a server-side program running within a virtual machine executing on a network-connected server, said method comprising the steps of:
   within said server-side program, beginning a first process;
   launching at least a first event monitor responsive to said beginning step;
   detecting an external event transmitted from a client connected to the server, wherein the external event occurs outside said virtual machine;
   in response to detecting the external event, broadcasting a virtual machine event to each event monitor executing within the virtual machine, including the first event monitor, that is configured to detect the broadcasted virtual machine event;
   detecting said virtual machine event with said first event monitor; and,
   invoking a first program response responsive to said detecting step.

2. The method of claim 1, wherein said beginning step further comprises the step of initializing a first thread, wherein said first process is preformed by said first thread, and wherein said launching step further comprises the step of linking said first event monitor to said first thread, and wherein said first program response within said invoking step acts upon said first thread.

3. The method of claim 2, further comprising the steps of:
   completing execution of said first thread;
   responsive to said completing step, releasing said first thread; and,
   responsive to said releasing step, deactivating said first event monitor.

4. The method of claim 1, further comprising the steps of:
   within said server-side program, beginning a second process;
   launching a second event monitor responsive to said beginning step that begins said second process;
   detecting said virtual machine event with said second event monitor; and,
   invoking a second program response responsive to said detecting step that utilizes said second event monitor.

5. The method of claim 4, wherein said first program response is different from said second program response.

6. The method of claim 4, wherein said beginning step that begins said second process further comprises the step of initializing a second thread, wherein said second process is performed by said second thread, and wherein said launching step that launches said second event monitor further comprises the step of linking said second event monitor to said second thread, and wherein said second program response within said invoking step acts upon said second thread.

7. The method of claim 6, wherein said virtual machine event is detected by said first event monitor, and wherein said virtual machine event is detected by said second event monitor.

8. The method of claim 6, wherein said virtual machine event is detected by said first event monitor, and wherein said virtual machine event is not detected by said second event monitor.

9. The method of claim 1, wherein said virtual machine is disposed within a Web server and at least one client utilizing said server-side program is a Hypertext Transfer Protocol client.

10. The method of claim 1, wherein said server-side program is a servlet.

11. A method for configuring an external event handler within a virtual machine executing on a network-connected server, said method comprising the steps of:
invoking a server-side program;
instantiating an event dispatcher within said server-side program configured to broadcast at least one virtual machine event;
starting at least one process within said server-side program;
for each of said at least one process, starting an event monitor configured to detect at least one virtual machine event and to invoke a corresponding response by said at least one process in response to detecting the at least one virtual machine event;
generating the at least one virtual machine event in response to detecting an external event transmitted from a client communicatively linked via a network to the server, wherein the external event occurs outside said virtual machine; and
through said event dispatcher, broadcasting the at least one virtual machine event to each event monitor configured to detect the at least one virtual machine event.

12. The method of claim 11, wherein at least a portion of said at least one virtual machine event that each of said event monitors is configured to detect is not broadcast by said event dispatcher.

13. The method of claim 11, further comprising the steps of:
receiving an external event; and,
triggering said event dispatcher to broadcast at least one virtual machine event responsive to said external event.

14. The method of claim 13, wherein said external event is a program interrupt event, wherein said method further comprises the steps of:
terminating each of said at least one process that are running within said server-side program; and,
terminating said server-side program.

15. A system for handling external events within a server-side program comprising:
a virtual machine disposed within a server;
an event processor disposed within said virtual machine, said event processor configured to detect at least one external event transmitted from a client communicatively linked via a network to said server;
a server-side program disposed within said virtual machine configured to process at least one client request;
an event dispatcher disposed within said server-side program configured to broadcast at least one virtual machine event in response to a broadcast trigger activated by said event processor in response to detecting the at least one external event; and,
at least one virtual machine event monitor, wherein each virtual machine event monitor is linked to a specified process resulting from one of said at least one client requests, and wherein each virtual machine event monitor can detect at least one virtual machine event broadcasted by said event dispatcher and to invoke a corresponding response by said specified process in response to detecting the at least one virtual machine event.

16. The system of claim 15, wherein said server is a Web server and said at least one client request includes at least one Hypertext Transfer Protocol request.

17. The system of claim 15, wherein multiple instances of said server-side program can simultaneously operate within said virtual machine.

18. The system of claim 15, wherein said server-side program is constructed using an object-oriented methodology, wherein a container object exists containing a server-side program object and an event dispatcher object.

19. The system of claim 18, wherein said event dispatcher comprises one or more methods, said methods comprising:
an add virtual machine event monitor method;
a remove virtual machine event monitor method; and,
a broadcast virtual machine event method.

20. The system of claim 15, wherein said server-side program is a servlet.

21. A machine readable storage having stored thereon, a computer program having a plurality of code sections, said code sections executable by a machine for causing the machine to perform the steps of:
within a server-side program running within a virtual machine executing on a network-connected server, beginning a first process;
launching a first event monitor responsive to said beginning step;
detecting an external event transmitted from a client connected to the server, wherein the external event occurs outside said virtual machine;
in response to detecting the external event, broadcasting a virtual machine event to each event monitor executing within the virtual machine, including the first event monitor, that is configured to detect the broadcasted virtual machine event;
detecting said virtual machine event with said first event monitor; and,
invoking a first program response responsive to said detecting step.

22. The machine readable storage of claim 21, wherein said beginning step further comprises the step of initializing a first thread, wherein said first process is performed by said first thread, and wherein said launching step further comprises the step of linking said first event monitor to said first thread, and wherein said first program response within said invoking step acts upon said first thread.

23. The machine readable storage of claim 22, further comprising the steps of:
completing execution of said first thread;
responsive to said completing step, releasing said first thread; and,
responsive to said releasing step, deactivating said first event monitor.

24. The machine readable storage of claim 21, further comprising the steps of:
within said server-side program, beginning a second process;
launching a second event monitor responsive to said beginning step that begins said second process;
detecting said virtual machine event with said second event monitor; and,
invoking a second program response responsive to said detecting step that utilizes said second event monitor.

25. The machine readable storage of claim 24, wherein said first program response is different from said second program response.

26. The machine readable storage of claim 24, wherein said beginning step that begins said second process further comprises the step of initializing a second thread, wherein said second process is performed by said second thread, and wherein said launching step that launches said second event monitor further comprises the step of linking said second event monitor to said second thread, and wherein said second program response within said invoking step acts upon said second thread.

27. The machine readable storage of claim 26, wherein said virtual machine event is detected by said first event monitor, and wherein said virtual machine event is detected by said second event monitor.

28. The machine readable storage of claim 26, wherein said virtual machine event is detected by said first event monitor, and wherein said visual machine event is not detected by said second event monitor.

29. The machine readable storage of claim 21, wherein said virtual machine is disposed within a Web server and at least one client utilizing said server-side program is a Hypertext Transfer Protocol client.

30. The machine readable storage of claim 21, wherein said server-side program is a servlet.

31. A machine readable storage having stored thereon, a computer program having a plurality of code sections, said code sections executable by a machine for causing the machine to perform the steps of:
   invoking a server-side program;
   instantiating an event dispatcher within said server-side program configured to broadcast at least one virtual machine event;
   starting at least one process within said server-side program;
   for each of said at least one process, starting an event monitor configured to detect at least one virtual machine event and to invoke a corresponding response by said at least one process in response to detecting the at least one virtual machine event;
   generating the at least one virtual machine event in response to detecting an external event transmitted from a client communicatively linked via a network to the server, wherein the external event occurs outside said virtual machine; and
   through said event dispatcher, broadcasting the at least one virtual machine event to each event monitor configured to detect the at least one virtual machine event.

32. The machine readable storage of claim 31, wherein at least a portion of said at least one virtual machine event that each of said event monitors is configured to detect is not broadcast by said event dispatcher.

33. The machine readable storage of claim 31, further comprising the steps of:
   receiving an external event; and,
   triggering said event dispatcher to broadcast at least one virtual machine event responsive to said external event.

34. The machine readable storage of claim 33, wherein said external event is a program interrupt event, wherein said method further comprises the steps of:
   terminating each of said at least one process that are running within said server-side program; and,
   terminating said server-side program.

\* \* \* \* \*